Figure 1:
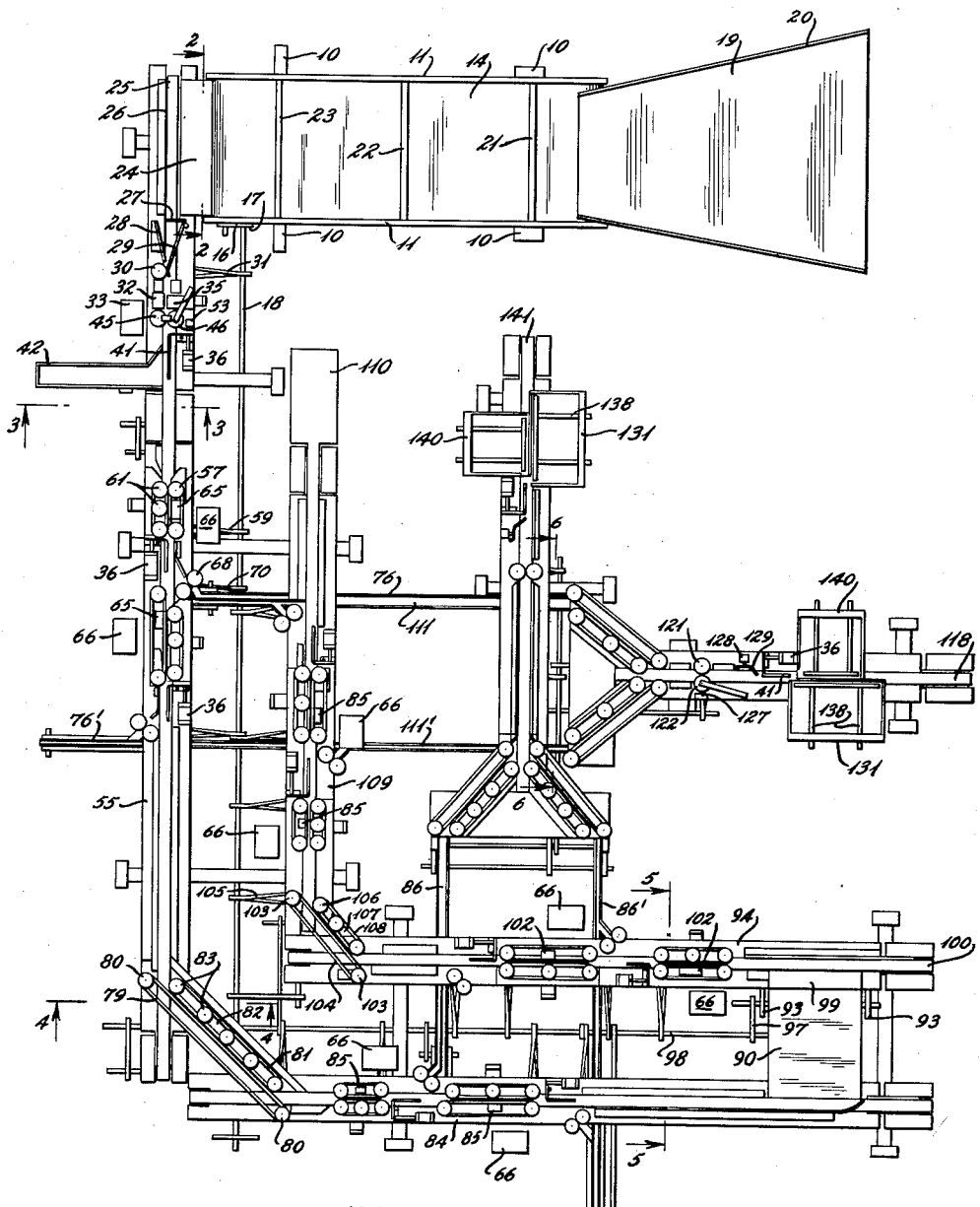

Nov. 27, 1962     B. B. NIXON ETAL     3,065,850
AUTOMATIC MAIL FACING AND SORTING MACHINE
Filed Aug. 29, 1958                              6 Sheets-Sheet 1

INVENTORS
BILLIE B. NIXON &
JOE C. NIXON
BY
ATTORNEY

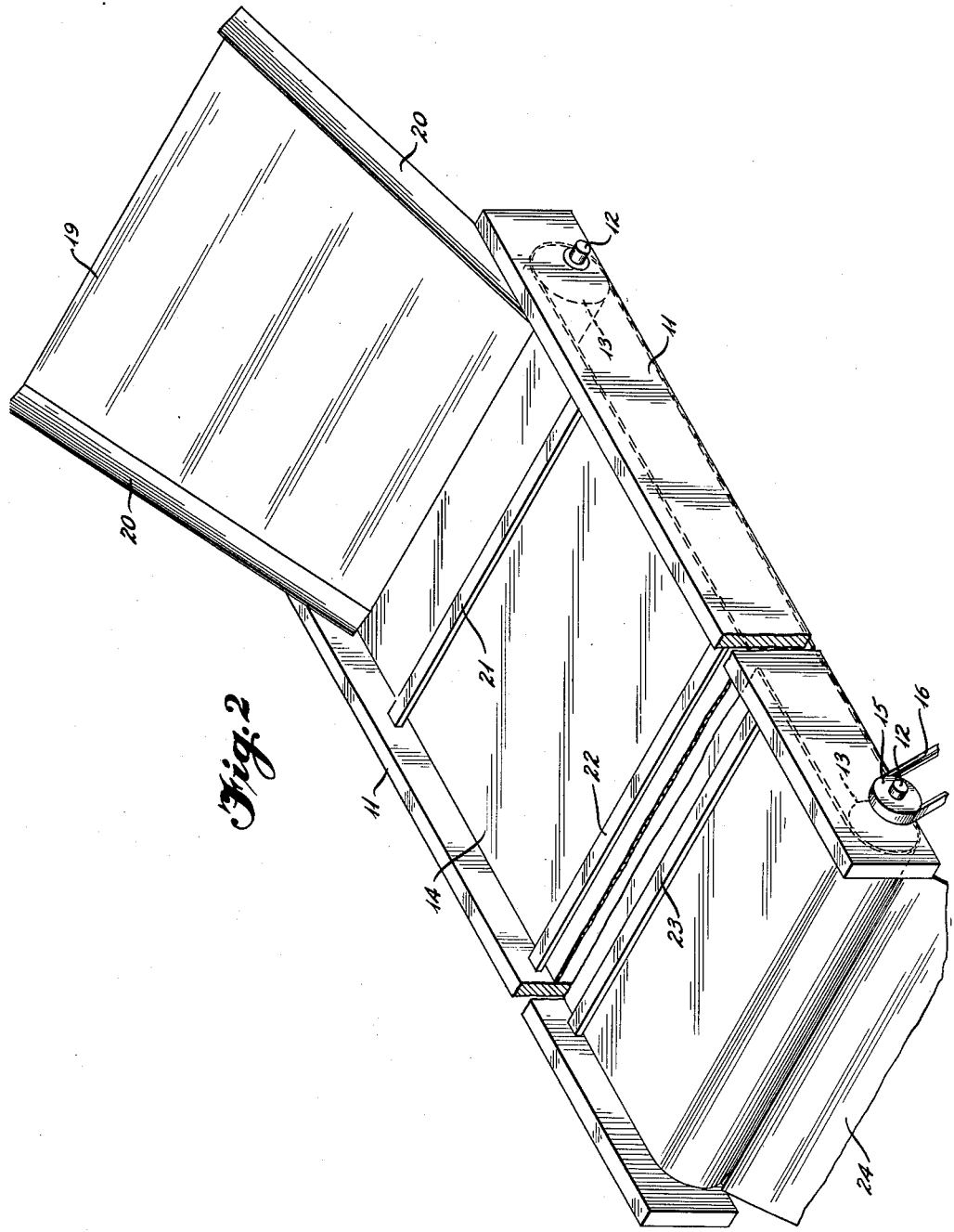

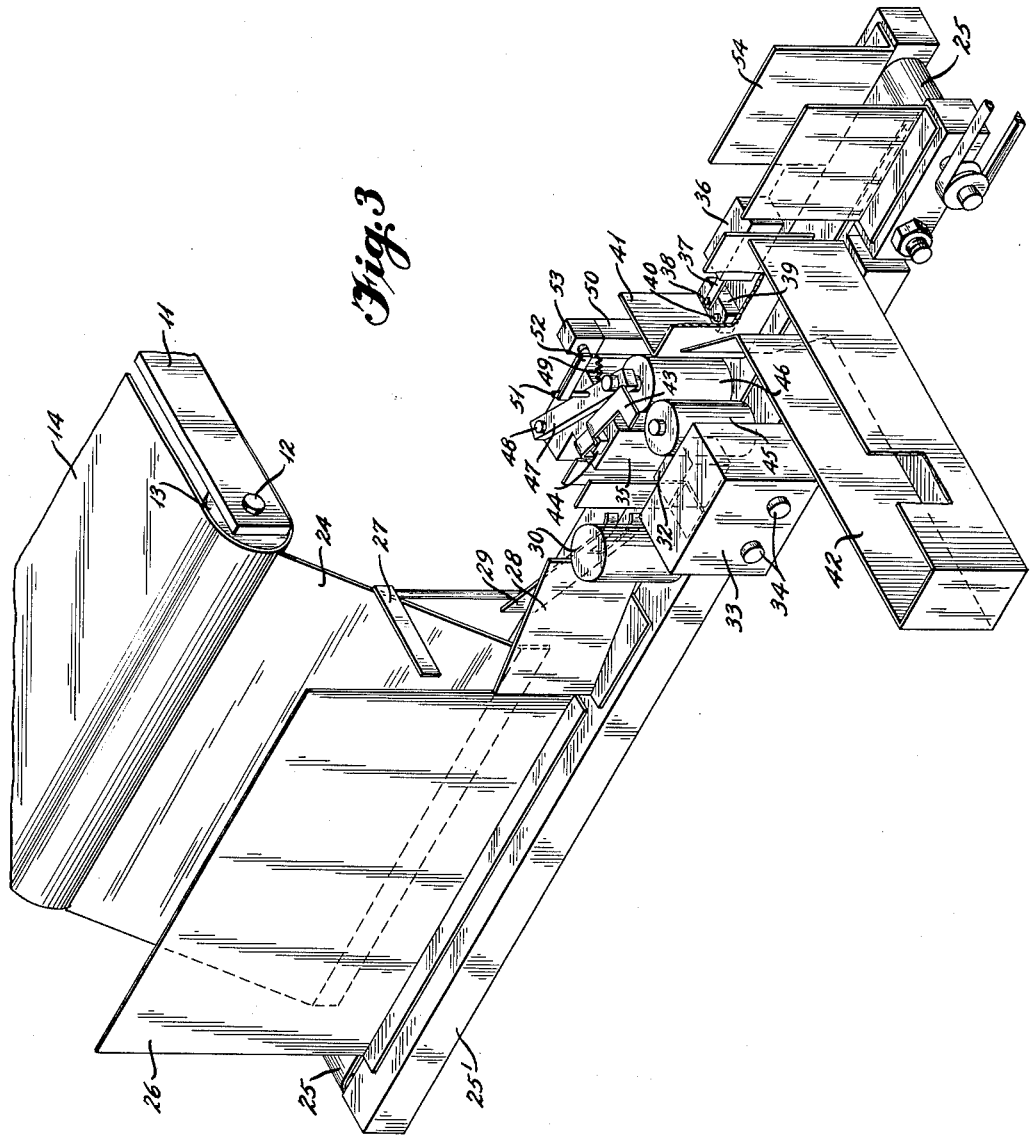

Nov. 27, 1962     B. B. NIXON ETAL     3,065,850
AUTOMATIC MAIL FACING AND SORTING MACHINE
Filed Aug. 29, 1958     6 Sheets-Sheet 4
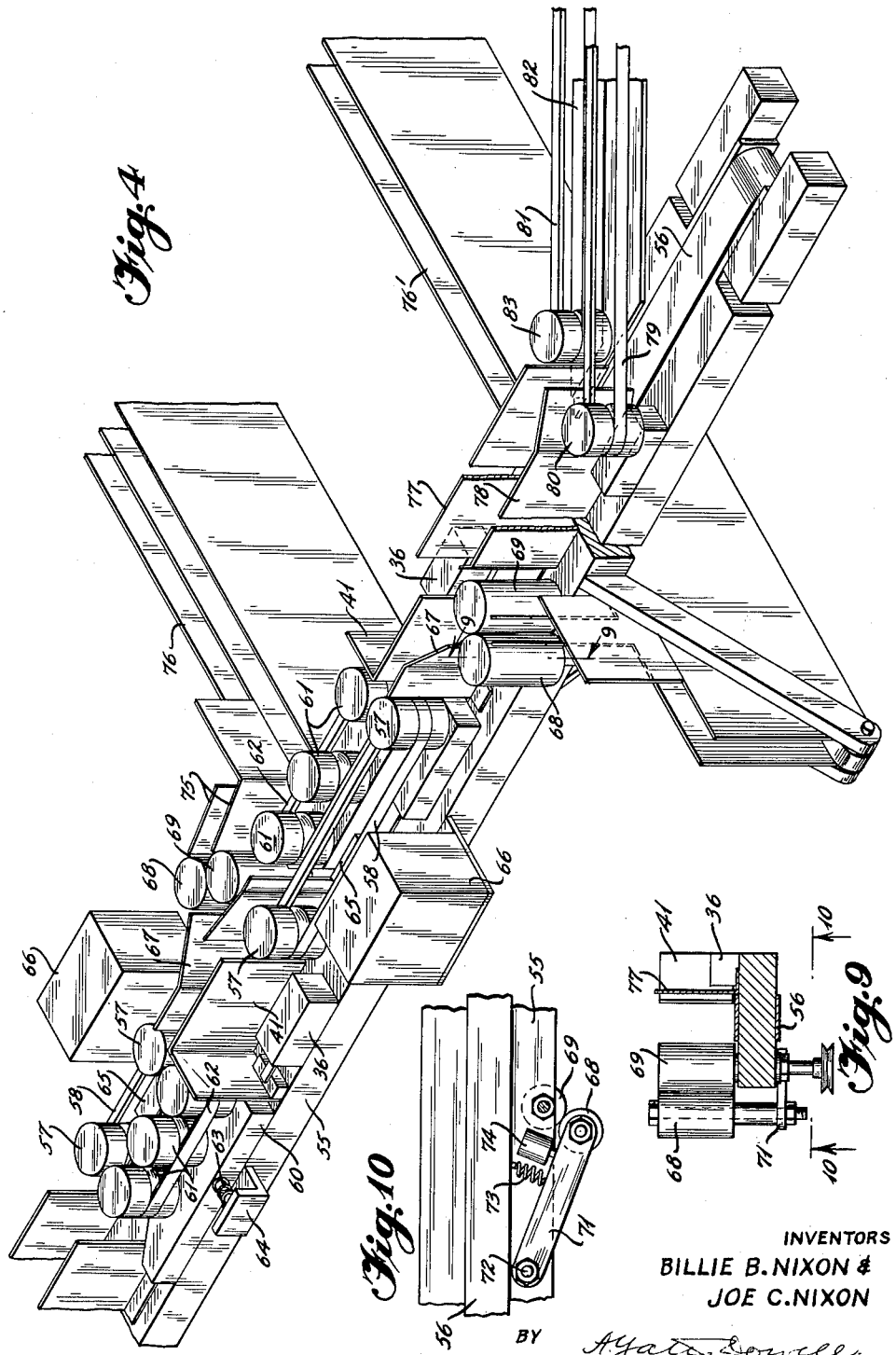
INVENTORS
BILLIE B. NIXON &
JOE C. NIXON
BY
ATTORNEY Nov. 27, 1962     B. B. NIXON ETAL     3,065,850
AUTOMATIC MAIL FACING AND SORTING MACHINE
Filed Aug. 29, 1958     6 Sheets-Sheet 5
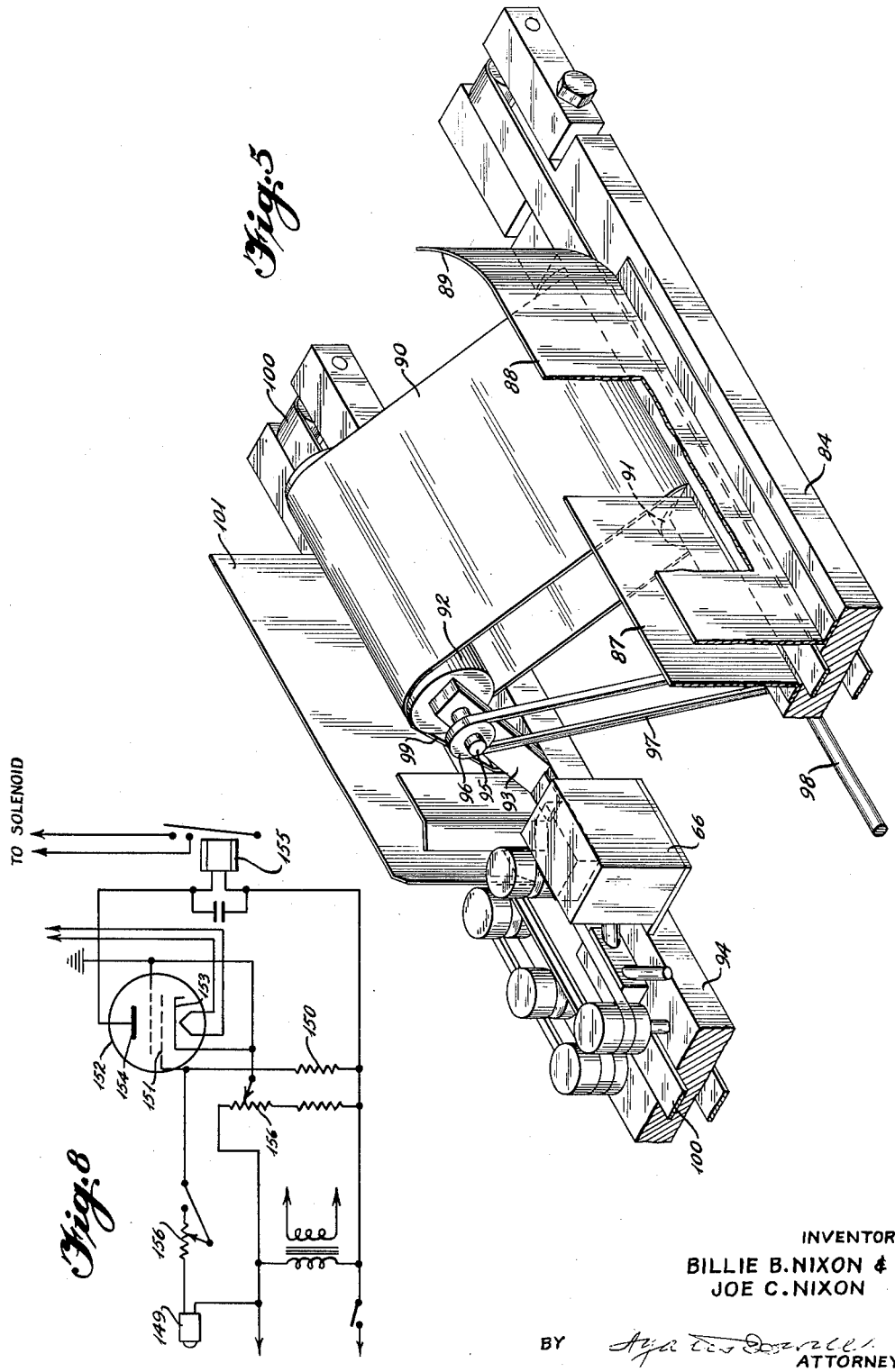
INVENTORS
BILLIE B. NIXON &
JOE C. NIXON
BY
ATTORNEY

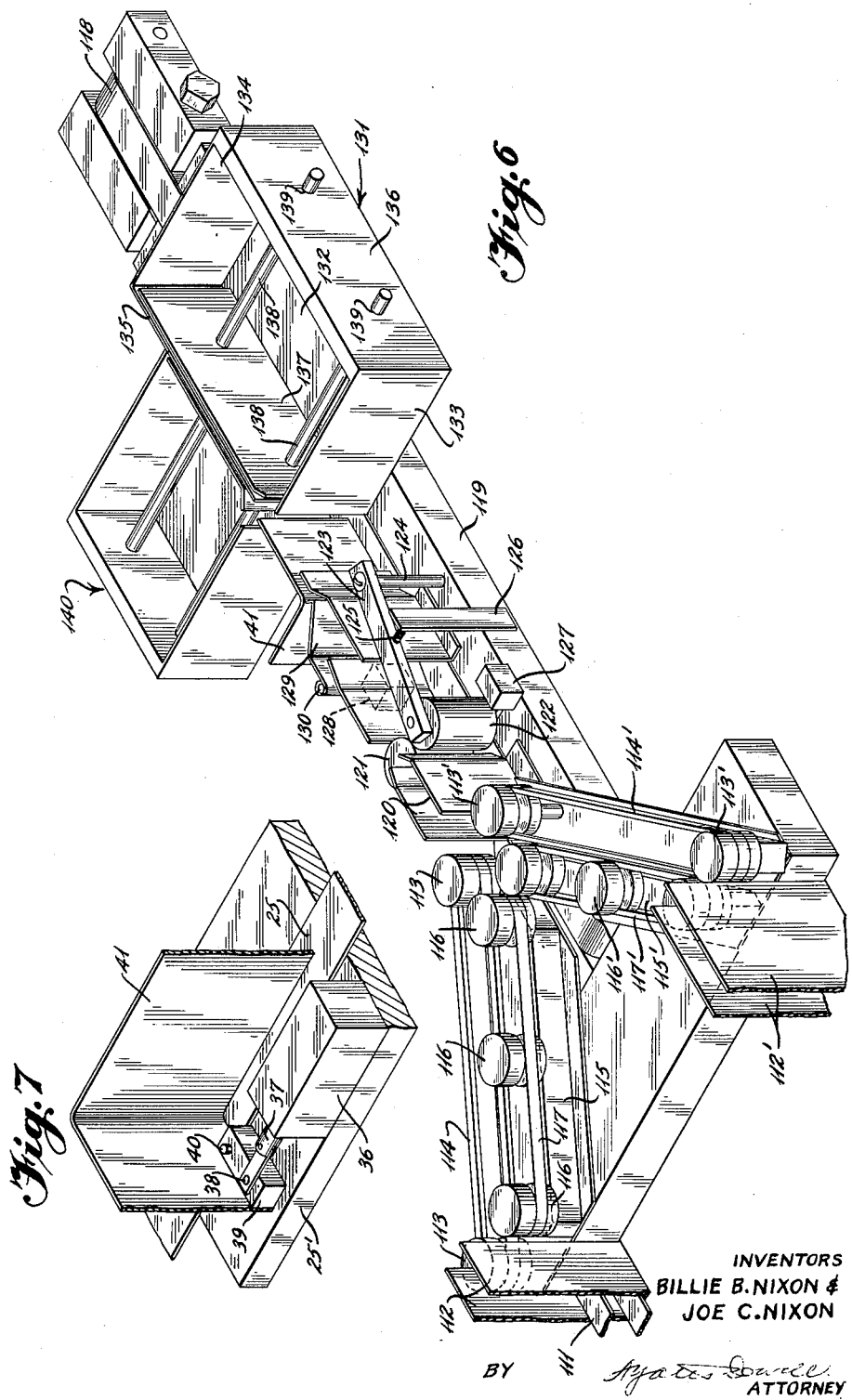

United States Patent Office 3,065,850
Patented Nov. 27, 1962

3,065,850
AUTOMATIC MAIL FACING AND SORTING MACHINE
Billie B. Nixon, 2601 Virginia, Fort Smith, Ark., and Joe C. Nixon, Rte. 3, Charleston, Ark.
Filed Aug. 29, 1958, Ser. No. 758,115
3 Claims. (Cl. 209—75)

The present invention relates to the arrangement of articles in a particular or orderly manner in one location and the distribution of such articles from such location or central source to the respective remote locations or stations.

The invention is concerned more particularly with the arranging and sorting of mail in central and remote post offices and with apparatus or equipment employed to perform such arranging or facing and sorting operations.

Heretofore, mail brought to the post office by the route trucks has been sorted relative to length of the individual piece of mail and the denomination of the postage and with all of the postage stamps facing in the same direction prior to running the mail through the machine for cancelling the stamps. This operation normally is done by hand or by operators who operate machines for facing and sorting the mail.

It is an object of the present invention to provide a commercially practical automatic machine for facing and sorting mail according to the denomination of the stamps thereon and according to the length of the individual letters or pieces of mail.

Another object is to provide an automatic machine which will discharge letters along pre-selected paths, expelling letters which are too large or too heavy and automatically face all the letters in the same direction and sorting the letters according to length.

Other objects and advantages of the invention will be apparent from the following description taken in conjunction with the accompanying drawings wherein:

FIG. 1 is a top plan view illustrating one embodiment of the present invention;

FIG. 2, an enlarged fragmentary perspective on the line 2—2 of FIG. 1;

FIG. 3, an enlarged perspective on the line 3—3 of FIG. 1;

FIG. 4, an enlarged perspective on the line 4—4 of FIG. 1;

FIG. 5, an enlarged perspective on the line 5—5 of FIG. 1;

FIG. 6, an enlarged perspective on the line 6—6 of FIG. 1;

FIG. 7, an enlarged detail perspective of one of the kick-out gates;

FIG. 8, wiring diagram of the electrical units which control the kick-out gate of FIG. 7;

FIG. 9, a section on the line 9—9 of FIG. 4; and

FIG. 10, a section on the line 10—10 of FIG. 9.

Briefly stated, the mail facing and sorting machine of the present invention comprises a chute into which mail is deposited, a conveyor belt which takes the mail from the chute and delivers it to the facing and sorting machine, means for turning letters which are on end, a timer roller which admits one letter at a time to the machine. The machine is also provided with mechanism to kick out letters which are too large and letters which are too heavy. A series of color sensitive photo electric cell units are provided which are activated by color sensitive photo tubes to direct the letters to different stations or collecting points depending on the color stamp and the length of the letter. Means are provided to turn some of the letters so that all the letters face in the same direction.

With continued reference to the drawings, legs 10 support a pair of spaced sides 11 connected at the ends by shafts 12 on which rollers 13 are mounted and a conveyor belt 14 extends around the rollers 13. One of the shafts 12 is provided with a pulley 15 which is driven by a belt 16 from a pulley 17 mounted on a central drive shaft 18.

Mail is delivered to the conveyor 14 by a mail chute having a bottom 19 and upturned side flanges 20 to direct the mail onto the conveyor 14. The chute bottom 19 is larger at the top than at the bottom. Guides 21, 22 and 23 are placed in spaced relation along the length of the conveyor belt 14. The guide 21 is nearest to the delivery chute 19 and is spaced approximately 1½ inches above the belt 14. The guide 22 is located midway of the conveyor 14 and is spaced approximately an inch above the same. The guide 23 is located near the discharge end of the conveyor belt 14 and is spaced approximately ¾ of an inch thereabove. The guides 21, 22 and 23 allow only a few letters at a time to be fed to the machine.

At the discharge end of the conveyor belt is located a letter slide 24 down which the letters are adapted to slide onto a conveyor belt 25. Such conveyor belt is mounted on a base 25' having cut-out portions on both ends which receive belt mounting rollers. An upright guide 26 serves to retain the letters on the belt 25. Letters are carried along the belt 25 from left to right as viewed in FIG. 3. A letter bar 27 is located adjacent the end of the slide 24 and is preferably spaced approximately 6 inches above the belt 25 so that letters which fall on end will be turned to go into the machine on one of its sides. Letters which pass under the bar 27 are confined between a guide 28 and a spring finger 29 secured at one end to the base 25' which directs the letters to a timer roller 30.

The timer roller 30 is a generally cylindrical roller mounted on the base 25' and has a portion overlying the belt 25 in spaced relation thereto. This roller is driven by a belt 31 from the main drive shaft 18 and the free end of the spring finger 29 is biased into contact with the roller 30 so that the roller will engage one letter at a time and direct the same between a hollow box 32 containing a source of light and a block 35.

The box 32 contains a light and a color sensitive photo tube which will be later described and such box is connected to a photo electric cell 33 having adjustments 34 to vary resistances in the electrical circuits to permit fine adjustment of the photo electric cell. The light box 32 has an opening in the center of the wall which faces inwardly toward the block 35 and such opening is located approximately two inches above the belt 25 in a position whereby the stamps on the letters will pass either above or below such opening. The light from within the box 32 is directed through the opening in the center of the inner wall where it strikes the block 35 which has been painted white and is reflected back through the opening to the color sensitive photo tube. Radiations emitted by the white block are of a predetermined value and the photo tube is adjusted to accept such radiations.

White envelopes which are directed between the light box 32 on the block 35 will emit radiations equal to those of the block and will not change the resistance values in the photo tube. However an envelope having a dark color will absorb some of the light rays and the reflected radiations will be less intense and will cause a decrease in resistance in the photo tube. This decrease will cause an amplifier in the photoelectric cell to energize a solenoid switch 36 having an arm 37 connected by a pivot pin 38 to a member 39. The member 39 is mounted by a pivot pin 40 to the base 25' and is adapted to support a generally L-shaped expulsion gate 41 the leg of which normally extends parallel to the belt 25 and is located over one edge of such belt. When the solenoid 36 is energized by the photo tube, the gate 41 is pivoted about the pin 40 to a position diametrically across the belt 25 to divert any object on the belt into an expulsion or kickout box 42.

Letters which pass the light box 32 must then pass under a microswitch arm 43 constructed of spring metal which controls a conventional microswitch 44 located on the block 35. The arm 43 is spaced above the belt 25 approximately 5 inches and any letter or any object passing beneath such arm will have no effect on the microswitch 44. However, a letter or other object which is 5 inches or greater in height will raise such arm and break the contact of microswitch 44 and energize the solenoid 36 to move the gate 41 across the belt and divert the object into the kickout box 42.

Simultaneously the letter or other object passes between a pair of thickness gauge rollers 45 and 46. The roller 45 is mounted in fixed position on the base 25' and the roller 46 is mounted on an arm 47 attached to the block 35 by a pivot pin 48. The roller 46 is urged toward the roller 45 by a spring 49 having one end connected to the arm 47 and the other end in engagement with an upright post 50. The arm 47 is provided with a pin 51 to which an arm 52 is attached in such a manner that when the roller 46 is forced away from roller 45 a predetermined distance the arm 52 will close microswitch 53 mounted on post 50 and the closing of the microswitch 53 will energize solenoid 36 and discharge any objects which are too thick into the kickout box 42.

A letter or other object which satisfies the requirements as to color, height and thickness will then pass between guides 54 and will be carried to the first of a series of arranging or facing heads. The first pair of facing heads is mounted on a base 55 having a conveyor belt 56 which runs the length of such base 55. The upper run of such belt is on top of the base 55 and the lower run is beneath such base.

The first facing head is provided with a pair of spaced rollers 57 connected by a V-belt 58 and one of the rollers 57 is driven by belt 59 from the shaft 18. Opposite the rollers 57 is the tension idler block 60 having a plurality of rollers 61 connected by V-belt 62 which is urged into contact with the belt 58 by a spring 63 mounted in a bracket 64 and in engagement with the block 60. A light box 65 is provided between the rollers 57 and such light box is adapted to contain a light, a color sensitive photo tube and a filter. The light box 65 is connected to the photo electric cell 66 similar to photo electric cell 33.

The light box 65 is provided with an opening in its center approximately ¾ of an inch above the belt in alignment with a stamp carried by a letter and such opening is covered by a blue filter which absorbs all of the blue light rays so that no blue rays pass the filter. The color sensitive photo tube in the light box is adjusted to accept a specified amount of light intensity from the reflected rays of a 2.22 volt bulb from which radiations emitted by the blue rays have been absorbed. A letter with a blue stamp passing through the facing head will emit substantially the same amount of radiation and will not affect the photo tube. However, a letter with a stamp of a color other than blue will absorb a greater amount of light rays and decrease the light intensity on the color sensitive photo tube to therefore decrease the resistance in the photo electric cell and energize the solenoid 36 which operates the explusion or kickout gate 41 to direct letters past a guide 67 to a pair of discharge rollers 68 and 69. The discharge roller 69 is driven by a belt 70 from the main drive shaft 18 and the discharge roller 68 is mounted on an arm 71 which is pivotally attached to the bottom of the base 55 by a pin 72. A tension spring 73 normally holds the roller 68 in intimate contact with the roller 69 but when a letter passes between such rollers, roller 68 is forced open and the arm 71 closes a microswitch 74 which is connected to the solenoid 36 to maintain the gate in its discharge position until the letter passes through the rollers 68 and 69 down a chute 75 into a cross-conveyor trough 76.

A letter which has a blue stamp or a letter which has a stamp which does not pass in front of the filtered light opening of the light box in the first facing head then passes to a second facing head. The second facing head is identical with the first facing head except for the location of the light box and associated parts which are on the opposite side of the base and letters with a stamp on the lower portion as seen in FIG. 4 will be affected by the light box 65. Letters with stamps of a color other than blue will cause the solenoid 36 to be energized and move the gate 41 to discharge letters between the rollers 68 and 69 into the cross-conveyor trough 76'.

Letters which carry a blue stamp on the bottom of either side and letters with stamps located on the top will pass through sorting head No. 2 and will be carried by the belt 56 to substantially near the end of the base 55 between a pair of guides 77 and 78 which maintain the letters on the belt 56. Adjacent the end of the guides 77 and 78 is located a transfer drive belt 79 which operates around a pair of rollers 80. A belt 81 and a tension idler block 82 provided with rollers 83 are maintained in contact with the belt 79 and a letter on the belt 56 will come into contact with the belt 79 which extends diagonally across the belt 56 and approximately 2 inches thereabove. The belt 79 will direct the letters between the belts 79 and 81 and transfer the same from the base 55 to a base 84.

The base 84 contains a pair of facing heads which are identical with the facing heads on the base 55 with the exception that the light box 85 contains no filter and therefore letters having a blue stamp located on the bottom of the letter as it passes through the facing head will be discharged in to cross conveyor troughs 86 and 86'.

All letters with the stamp on the bottom should now have been diverted from the main path of travel. The letters remaining should have stamps on the top or in a few cases have no stamp at all.

In order to face and sort the letters with a stamp on top it is necessary to turn the letters over so that the stamp will appear on the bottom in order to be affected by the light boxes of the facing heads. In order to turn the letters over, the base 84 is provided with guides 87 and 88. The guide 88 is provided at its extremity with a curved portion 89 which overlaps the conveyor belt and any letters traveling along the conveyor belt and coming into contact with the curved portion 89 will be turned on their sides and deposited on a canvas conveyor belt 90. The belt 90 is supported by roller 91 rotatably mounted on the base 84 and the other end of the belt is supported by a roller 92 carried by a pair of arms 93 which extends upwardly and outwardly from a base 94 in order to support the roller 92 between and somewhat above the base 84 and the base 94. The roller 92 is mounted on a shaft 95 which is rotatably mounted on supporting arms 93. A pulley 96 is mounted on the shaft 95 and is driven by a belt 97 from a pulley mounted on an auxiliary drive shaft 98. Letters which are deposited on the conveyor belt 90 will travel substantially uphill as the conveyor turns. A slide 99 is attached to the base 94 and extends upwardly and outwardly to a position adjacent the roller 92 so that letters carried by the belt 90 will be discharged onto the slide 99 from whence they will slide down onto a belt 100 to be carried into another pair of facing heads. Letters are prevented from sliding off the machine by stop guide 101 mounted adjacent the belt 100 and opposite the slide 99.

Letters which heretofore had their stamps at the top have now been turned over and the stamps are now at the bottom. The next pair of facing heads through which the letters pass contain light boxes 102 which contain a green filter. As the letters pass these facing heads the blue stamps are diverted into cross-conveyor channels 86' and 86 and letters with green or other dark color stamps continue through the facing heads to a transfer conveyor comprising a pair of rollers 103 connected by a belt 104 and driven by a belt 105 from drive shaft 18. Rollers 106 are mounted on tension block 107 and connected by a belt 108 which engages the belt 104 and is driven thereby. Letters which come into contact with the belt 104 are transferred from the base 94 to a base 109 where they are sent through another pair of facing heads which contain light boxes 84 which have no filter. These light boxes are energized by any letter having a colored stamp. These letters are diverted into cross-conveyor troughs 76' and 76. Letters which pass through these last facing heads are letters with improperly placed stamps, no stamp at all or which for some other reason have not been diverted into one of the several cross-conveyor troughs and these letters are deposited in a reject letter box 110.

Letters which have been diverted into the cross-conveyor troughs 76 and 76' are carried by belts 111 and 111' between the guides 112 and 112', respectively, beneath the base 109. The cross-conveyor troughs 76 and 76' discharge the letters into converging transfer members having rollers 113 connected by a belt 114 and an opposed tension idler block 115 having rollers 116 connected by a belt 117 and such belt being in engagement with belt 114 and being driven thereby in such a manner that letters taken from belt 111 will pass between the belts 114 and 117 and be deposited on the base 118 on the base 119. Similarly the letters on the belt 111' will be engaged by a belt 114' driven by the rollers 113' and in engagement with the belt 117' which turns the rollers 116' to deliver the letters from the belt 111' to the belt 118. Letters from the converging transfer members are directed by guides 120 between a pair of rollers 121 and 122. Roller 121 is rotatably mounted in fixed position relative to the base 119 and roller 122 is rotatably mounted on an arm 123 and such arm is connected by a pivot post 124 to the base 119. Roller 122 is normally urged toward the roller 121 by a spring 125 one end of which bears against the arm 123 and the other end against an upright arm 126 which is mounted on the base 119. A letter passing between the rollers 121 and 122 will force the roller 122 away from the roller 121 and into contact with a micro-switch 127 which is connected in series with a micro-switch 128 controlled by gate 129 mounted by a pivot 130 to the base 119. Letters which pass through the rollers 121 and 122 and keep micro-switch 127 closed until gate 129 closes micro-switch 128 will complete a circuit to energize solenoid 36 to operate the gate 41 and direct the letter into the long letter holder 131. The letter holder 131 comprises a bottom 132, a pair of ends 133 and 134, front plate 135 and a back plate 136. The corner between the end 133 and the front 135 is left open to permit a letter to be directed therein. In order to keep the letters in the box neatly stacked a plate 137 is provided having a pair of rods 138 adapted to pass through openings 139 in the back plate 136. As each succeeding letter enters the space between the front 135 and the plate 137 the plate is forced farther and farther away from the front 135 and the rods 138 project farther through the back 136.

Letters which are too short to energize both of the micro-switches 127 and 128 simultaneously do not energize solenoid 36 and the gate 41 and the letters are therefore directed into the short letter holder 140 which is similar in construction to the long letter holder with the exception of the length thereof. The front 135 serves both the long letter holder and the short letter holder 140.

Letters which have been diverted into the cross conveyor troughs 86 and 86' are carried to similar converging transfer members and thence to conveyor belt 141 where they are subjected to a length determining and selecting mechanism to separate the long letters from the short letters as previously described.

In the operation of the color sensitive photo tube, a color sensitive photo cell 149 is provided which may be adjusted to receive a predetermined amount of light intensity. Light rays are provided by a 2.22 volt bulb which shines against the white surface of a tension idler block and reflects along a tube in which the photo cell is located. A filter may be interposed along the path of the light rays and such filter is adapted to absorb a specific color, so that the rays of that color will not pass the filter. If desired a colored bulb may be substituted for the plain bulb and colored filter. When a letter with a stamp thereon of the same color as the filter passes through the facing head, the photo cell will not be affected. When a letter with a stamp thereon of color different than the filter passes through the facing head, the photo cell will be energized by the differential in light intensity which will cause the voltage across the resistor 150 to become more positive and to be transmitted to the central grid 151 of a gas discharge tube such as a thyratron tube 152. When the voltage across the control grid 151 of the thyratron tube 152 becomes more positive and upsets the normal balance, cathode 153 is caused to fire at anode 154 which transmits the current to a relay 155 to make the circuit with the solenoid 36 to operate gate 41.

The CDS3 photo cell is adjustable to varying light intensity through a vernier control provided by potentiometer 156.

In order to face all the letters in the same direction, letters with the stamp on the left side as they pass through the facing heads are discharged to the left so that the stamps face the direction from which the letters came. Letters with the stamp on the right side as they pass through the facing heads are discharged to the right so that these stamps also face the direction from which the letters came. The machine is arranged to discharge similar stamps onto a cross-conveyor trough when the stamps are on the bottoms of the letters and then to automatically turn the letters over and discharge the letters onto the appropriate conveyor trough. A trough divider or partition 157 may be provided in cases where letters are discharged onto a cross-conveyor trough contrary to the normal movement of such letters.

From the foregoing it will be apparent that there is provided a mail facing and sorting machine into which letters may be placed, conveyed and handled one at a time with the envelopes of a dark color and of a size or other characteristic unacceptable to the machine ejected by means of a color sensitive photo electric cell or electric eye and additional electrically operated means. Similar equipment is provided for sorting letters according to the color of the stamps thereon. Also, means is provided for facing the letters in the same direction, and sorting letters according to length.

If desired certain sections may be removed in order that all letters are faced properly for the cancelling machine without separating air mail from regular mail. Also as many sections as desired may be added to sort and face stamps of different denominations into separate collecting stations. The color sensitive photo electric tube is of sufficient sensitivity and is capable of being adjusted to distinguish between shades of the same general color as for instance the difference between light red and dark red etc.

It will be obvious to those skilled in the art that various changes may be made in the invention without departing from the spirit and scope thereof and therefore the invention is not limited by that which is illustrated in the drawings and described in the specification, but only as indicated in the accompany claims.

What is claimed is:

1. An automatic mail facing and sorting machine comprising conveyor belt means, a plurality of facing heads disposed along both sides of said conveyor belt means, gate means operatively associated with each facing head to divert letters from said conveyor belt means, the first of said facing heads diverting letters to one side of said conveyor belt means with the stamps facing in one direction, a first cross conveyor for receiving said diverted letters, the second of said facing heads diverting letters to the opposite side of said conveyor belt means with the stamps facing in the same direction as the letters diverted from the first facing head, a second cross conveyor located beneath the conveyor belt means for receiving letters from said second facing head, means for turning over the letters remaining on said conveyor belt means, the third of said facing heads diverting letters to said second cross conveyor with the stamps facing in the same direction as letters diverted from said second facing head, the fourth of said facing heads diverting letters to said first cross conveyor with the stamps facing in the same direction as letters diverted by said first facing head, a third cross conveyor, a pair of converging transfer members connecting said first and second cross conveyors with said third cross conveyor to transfer said letters to said third conveyor with all of the stamps facing in the same direction.

2. Apparatus for facing letters in the same direction comprising conveyor means on which said letters are placed, a series of facing heads located along both sides of said conveyor means and having color sensitive means energized by the color of a stamp on said letters, gate means associated with each of said facing heads and operated by said color sensitive means to divert letters from said conveyor means, the first facing head diverting letters to one side of said conveyor means, a first cross conveyor for receiving said diverted letters, the the second facing head diverting letters to the opposite side of said conveyor means with the stamps facing in the same direction as the letters diverted from said first facing head, a second cross conveyor for receiving letters from said second facing head, said second cross conveyor crossing said conveyor means, a third cross conveyor, a pair of converging transfer members to transfer said letters from said first and second cross conveyors to said third cross conveyor with letters having stamps of a similar color diverted to one place with the stamps facing in the same direction.

3. The structure of claim 2 including means for turning over the letters remaining on said conveyor means, a second conveyor means operating in a direction opposite to said first conveyor means to receive letters which have been turned over, the third facing head diverting letters to said second cross conveyor with the stamps facing the same direction as the letters diverted from said second facing head, the fourth facing head diverting letters to said first cross conveyor with the stamps facing in the same direction as the letters diverted from said first facing head with all of the letters having similar stamp color being diverted to a single location and with the stamps facing in the same direction.

References Cited in the file of this patent

UNITED STATES PATENTS

| | | |
|---|---|---|
| 1,582,820 | Hungerford | Apr. 27, 1926 |
| 1,729,521 | Roddy | Sept. 24, 1929 |
| 1,846,808 | Hohn | Feb. 23, 1932 |
| 2,000,403 | Maul | May 7, 1935 |
| 2,138,645 | Rey | Nov. 29, 1938 |
| 2,162,529 | Dawson | June 13, 1939 |
| 2,293,500 | Fox | Aug. 18, 1942 |
| 2,358,051 | Broido | Sept. 12, 1944 |
| 2,609,928 | Doust | Sept. 9, 1952 |
| 2,635,747 | Hughes | Apr. 21, 1953 |
| 2,695,098 | Rendel | Nov. 23, 1954 |
| 2,833,408 | Norris | May 6, 1958 |

FOREIGN PATENTS

| | | |
|---|---|---|
| 294,575 | Great Britain | 1930 |
| 675,556 | Great Britain | July 16, 1952 |
| 682,303 | Great Britain | Nov. 5, 1952 |